United States Patent [19]

Suzuki et al.

[11] Patent Number: 4,467,188
[45] Date of Patent: Aug. 21, 1984

[54] DEVICE FOR SPLITTING LIGHT FROM AN OBJECTIVE LENS

[75] Inventors: Takashi Suzuki, Yokohama; Nozomu Kitagishi, Inagi; Susumu Matsumura, Kawasaki, all of Japan

[73] Assignee: Canon Kabushiki Kaisha, Tokyo, Japan

[21] Appl. No.: 333,883

[22] Filed: Dec. 23, 1981

[30] Foreign Application Priority Data

Jan. 6, 1981 [JP] Japan .................................. 56-565

[51] Int. Cl.³ .............................................. G01J 1/36
[52] U.S. Cl. .................................... 250/204; 250/227
[58] Field of Search ............... 350/167, 169; 250/201, 250/204, 216, 578, 227; 354/25; 356/4

[56] References Cited

U.S. PATENT DOCUMENTS

| | | | |
|---|---|---|---|
| 3,791,719 | 2/1974 | Kratzer et al. | 250/204 |
| 3,925,603 | 12/1975 | Naruse et al. | 250/201 |
| 3,967,109 | 6/1976 | Amos et al. | 250/201 |
| 4,047,022 | 9/1977 | Holle | 250/204 |
| 4,185,191 | 1/1980 | Stauffer | 250/204 |
| 4,230,942 | 10/1980 | Stauffer | 250/204 |

Primary Examiner—David C. Nelms
Assistant Examiner—J. Brophy
Attorney, Agent, or Firm—Fitzpatrick, Cella, Harper & Scinto

[57] ABSTRACT

A phase type diffraction grating and a microprism for splitting the light beam from an objective lens into three light beams. The three light beams are split in one direction by the diffraction grating and are directed onto three rows of line sensors disposed on the same plane. In the two optical paths between the diffraction grating and the line sensors, there is disposed an optical path length difference imparting element for forming on the line sensors images at a predetermined focal plane of the objective lens and planes forward and rearward of the predetermined focal plane. Thus, the line sensors detect the images at the predetermined focal plane and at planes forward and rearward of the predetermined focal plane.

4 Claims, 3 Drawing Figures

DEVICE FOR SPLITTING LIGHT FROM AN OBJECTIVE LENS

BACKGROUND OF THE INVENTION

1. Field of the Invention

This invention relates to a beam splitting device and more particularly to a beam splitting device in which the light beam from an objective lens is split by a beam splitter and an optical path length difference is imparted to at least one of the optical paths of the split light beams, so that at least two images having an optical path length difference are formed on a plurality of rows or sensors disposed substantially on the same plane, whereby these images are detected.

2. Description of the Prior Art

A device of the described type is applicable to a focus detecting system for a camera. As the means for splitting the light beam from the objective lens of this reading apparatus, the assignee of the subject application has already proposed an area-type beam splitter in Japanese patent application No. 98524/1980 filed on July 17, 1980 corresponding to U.S. patent application Ser. No. 283,001 filed on July 13, 1981. In this prior application, there is disclosed, as an example of the area-type beam splitter, a beam splitter comprising dot-like or stripe-like minute reflecting mirrors deposited on a glass substrate by evaporation and effecting beam splitting by reflection and transmission.

However, these beam splitter, which comprises minute reflecting mirrors deposited on a glass substrate by evaporation, is costly and difficult to manufacture.

SUMMARY OF THE INVENTION

It is an object of the present invention to provide a beam splitting device which eliminates the above-noted disadvantages.

The invention will become fully apparent from the following detailed description thereof taken in conjunction with the accompanying drawings.

DESCRIPTION OF THE PREFERRED EMBODIMENTS

Figure 1:
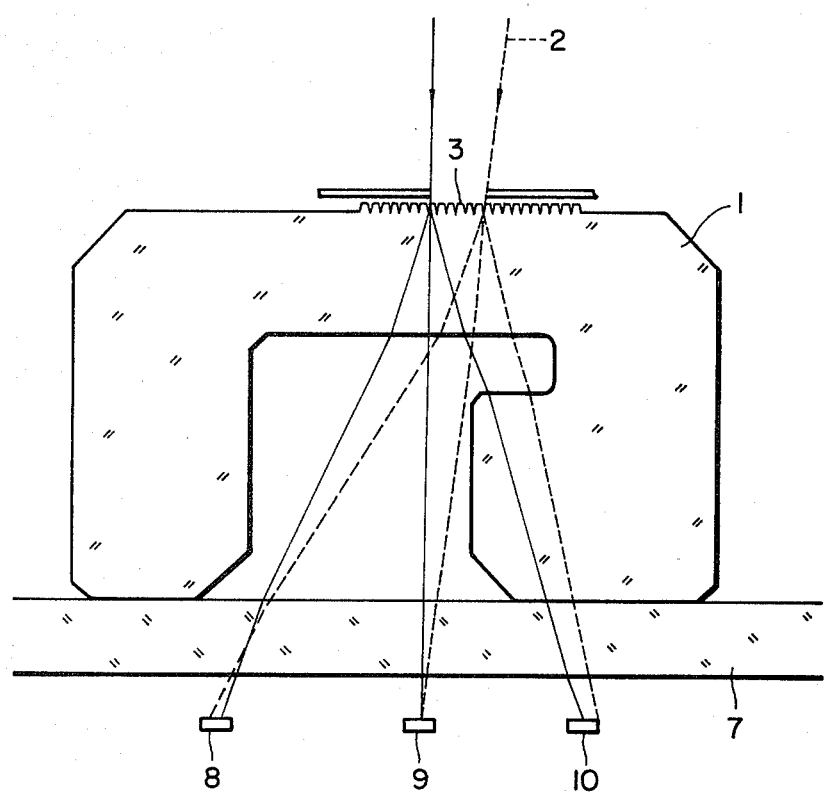
FIG. 1 shows a first embodiment of the present invention.

In FIG. 1, reference numeral 1 designates a beam splitter unit. This beam splitter unit 1 is formed of a transparent material such as glass or acrylic resin, and comprises a portion performing the function of beam splitting and a portion imparting an optical path length difference, the two portions being constructed integrally with each other. The light beam 2 from an objective lens, not shown, which includes image information enters from the entrance surface of the beam splitter unit 1. A beam splitter 3 is formed on this entrance surface. This beam splitter has a number of grating lines formed in the entrance surface thereof. In the present embodiment, the split light rays should only shift in one-dimensional direction and therefore, the grating lines are formed in one direction.

Turning back to FIG. 1, reference numeral 7 designates a transparent substrate to the surface of which is fixed the beam splitter unit 1. This substrate itself also has the function of imparting an optical path length difference. Denoted by 8, 9 and 10 are photoarray sensors such as CCD's formed on the same substrate.

The light beam 2 from the objective lens which has entered the beam splitter 3 is diffracted by a diffraction grating.

That is, the positive first order diffracted light travels toward the array sensor 8, the 0-order diffracted light rectilinearly travels toward the sensor 9 and the negative first order diffracted light travels toward the sensor 10. These light beams travelling toward the sensors 8, 9 and 10 differ in the length through the transparent body block 1 and the substrate 7. Accordingly, there is created an optical path length difference. This optical path length difference is determined so that if an in-focus image is formed on the array sensor 9, the array sensor 8 has its image formed in front thereof and the array sensor 10 has its image formed behind the sensor. These images having the optical path length difference are detected by the sensors 8, 9 and 10, respectively.

In the embodiment of FIG. 1, the optical path length difference is imparted by a transparent body having a refractive index difference, but the split light rays may also be caused to by-pass i.e. by reflection.

Figure 2:
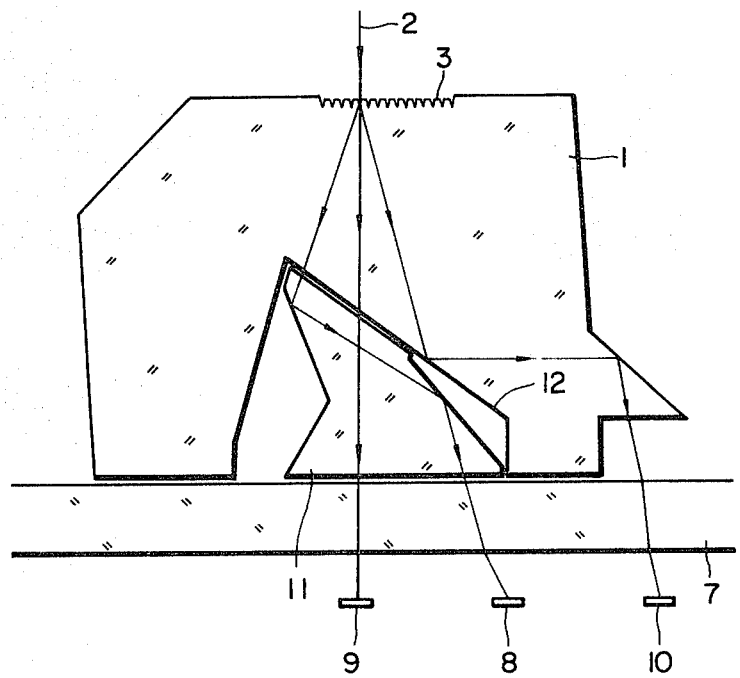
FIG. 2 shows a second embodiment of the present invention.

FIG. 2 shows an embodiment in which the optical path length difference is imparted by such by-passing. In this embodiment, the block 1 has an air-plastic boundary surface 12 inclined with respect to the optical path, and has another plastic block 11. The 0-order diffracted light passes through the boundary surface 12 and block 11 and travels toward the array sensor 9. The positive first order diffracted light passed through the boundary surface 12 into the block 11 and is twice subjected to total reflection and travels toward the array sensor 8. The negative first order diffracted light is subjected to total reflection by the boundary surface 12 and subjected to total reflection by the block 1 and travels toward the sensor 10. The split light rays differ in optical path length by a reflection amount and therefore, images having an optical path length difference are formed on the respective sensors.

The above embodiments have been described with respect to a case where a phase type one-dimensional diffraction grating is used as the beam splitter, but the beam splitter provided on the plane orthogonal to the optical axis of the phototaking lens may be of another type.

Figure 3:
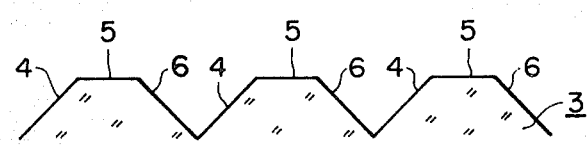
FIG. 3 shows a diffraction grating.

FIG. 3 shows another form of the beam splitter. The beam splitter 3 is formed by three kinds of minute inclined surfaces 4, 5 and 6 which differ in inclination with respect to the incident light. These inclined surfaces 4, 5 and 6 are regularly formed at intervals of $30\mu$–$90\mu$. The number of kinds corresponds to the number into which it is desired to split the light beam. The inclined surfaces 4, 5 and 6 have no inclination in the direction perpendicular to the surface of the drawing sheet.

The light beam 2 from the objective lens which has entered the beam splitter 3 is split by the inclined surfaces 4, 5 and 6.

That is, the light ray which has entered the inclined surface 6 travels toward the array sensor 8 as in the FIG. 1 embodiment, the light ray which has entered the inclined surface 5 rectilinearly travels toward the sensor 9, and the light ray which has entered the inclined surface 4 is deflected and travels toward the sensor 10. These light beams travelling toward the sensors 8, 9 and 10, respectively, differ in the length through the transparent body block 1 and the substrate 7.

Accordingly, there is created an optical path length difference. This optical path length difference is determined so that an in-focus image is formed on the array sensor 9, the array sensor 8 has its image formed in front of the sensor and the array sensor 10 has its image formed behind the sensor. These images having the optical path length difference are detected by the sensors 8, 9 and 10, respectively.

What we claim is:

1. A beam splitting device for causing a plurality of sensors disposed in the vicinity of a predetermined imaging plane of an objective lens to detect images of different imaging states, respectively, comprising:

light splitting means for splitting the light beam from the objective lens into a plurality of light beams, said splitting means having a light incidence surface disposed orthogonally with respect to the optical axis of the objective lens, said surface being formed with a grating of surface relief structure; and optical means for establishing different optical path lengths for the split beams between said splitting means and the sensors, said optical means being disposed between said splitting means and the sensors so as to provide different effects on the plurality of split beams, respectively.

2. A beam splitting device according to claim 1, wherein said optical means establishes said different optical path lengths for the split beams by providing at least one of the paths of the split beams with a refractive index different from the refractive index of the other paths.

3. A beam splitting device according to claim 1, wherein said optical means establishes said different optical path lengths for the split beams by causing at least one of the split beams to be reflected a pluality of times.

4. A beam splitting device according to claim 1, wherein said light splitting means and optical beams constitute a unitary structure.

* * * * *